(12) United States Patent
Schulte

(10) Patent No.: US 8,508,057 B2
(45) Date of Patent: Aug. 13, 2013

(54) POWER GENERATOR

(76) Inventor: David J. Schulte, Harbor Springs, MI (US)

( * ) Notice: Subject to any disclaimer, the term of this patent is extended or adjusted under 35 U.S.C. 154(b) by 417 days.

(21) Appl. No.: 12/972,450

(22) Filed: Dec. 18, 2010

(65) Prior Publication Data

US 2011/0127776 A1  Jun. 2, 2011

Related U.S. Application Data

(63) Continuation-in-part of application No. 12/534,342, filed on Aug. 3, 2009, now Pat. No. 8,203,224.

(51) Int. Cl.
*F02B 63/04* (2006.01)
*F03G 7/08* (2006.01)
*H02K 7/18* (2006.01)
*H01L 41/00* (2006.01)
*H02N 2/00* (2006.01)
*F42D 1/055* (2006.01)

(52) U.S. Cl.
USPC ....... 290/1 R; 290/1 A; 310/311; 310/323.01; 310/339; 102/200; 62/6

(58) Field of Classification Search
USPC ................ 290/1 A, 1 R; 310/323.01, 311, 310/339; 62/6; 102/200
See application file for complete search history.

(56) References Cited

U.S. PATENT DOCUMENTS

| | | | | |
|---|---|---|---|---|
| 3,967,185 A * | 6/1976 | Brooks | ............... | 363/160 |
| 4,114,380 A * | 9/1978 | Ceperley | ............... | 60/721 |
| 4,355,517 A * | 10/1982 | Ceperley | ............... | 60/721 |
| 4,398,398 A * | 8/1983 | Wheatley et al. | ............... | 62/467 |
| 4,504,760 A * | 3/1985 | Yamamoto et al. | ...... | 310/323.06 |
| 4,510,411 A * | 4/1985 | Hakamata et al. | ....... | 310/316.02 |
| 4,686,407 A * | 8/1987 | Ceperley | ............... | 310/323.01 |
| 4,763,148 A * | 8/1988 | Tsukimoto et al. | ........... | 396/133 |
| 4,789,809 A * | 12/1988 | Christensen | ............ | 315/39 |
| 4,797,597 A * | 1/1989 | Bostrom | ............... | 315/39 |
| 4,961,201 A * | 10/1990 | Opower | ............... | 372/94 |
| 5,088,411 A * | 2/1992 | Kurokawa et al. | ............ | 102/200 |
| 5,167,124 A * | 12/1992 | Lucas | ............... | 62/6 |
| RE34,409 E * | 10/1993 | Hakamata et al. | ....... | 310/316.02 |
| 5,357,757 A * | 10/1994 | Lucas | ............... | 62/6 |
| 5,361,737 A * | 11/1994 | Smith et al. | ............... | 123/143 B |
| 6,556,089 B2 * | 4/2003 | Wood | ............... | 331/57 |
| 6,816,020 B2 * | 11/2004 | Wood | ............... | 331/57 |
| 6,943,481 B2 * | 9/2005 | Okamoto et al. | ........ | 310/323.06 |
| 7,081,699 B2 * | 7/2006 | Keolian et al. | ............... | 310/311 |
| 7,161,438 B2 * | 1/2007 | Wood | ............... | 331/57 |
| 7,218,180 B2 * | 5/2007 | Wood | ............... | 331/96 |
| 7,236,060 B2 * | 6/2007 | Wood | ............... | 331/57 |

(Continued)

*Primary Examiner* — Pedro J Cuevas
(74) *Attorney, Agent, or Firm* — The Weintraub Group, P.L.C.

(57) ABSTRACT

The present invention provides a power generator for generating electricity comprising a high pressure core having an interior chamber. The interior chamber is filled with a volume of one or more pressurized inert gases. A microwave frequency generator is provided for resonating the gas at a high radio frequency typically 2.4 GHz or higher, and means for securing and emitting the frequency generator into the core are provided. In addition, electrical conductors are positioned in the core to effectuate the production of electricity through lightening, arc, flame, and high heat. The conductors extend through the core to conduct the flow of electricity away from the core. A coolant such as water may be circulated around the outside surface of the core to dissipate heat from the core, the coolant can then be converted to steam to power a turbine to provide a second method through which the invention generates electricity.

60 Claims, 6 Drawing Sheets

(56) References Cited

U.S. PATENT DOCUMENTS

| | | | |
|---|---|---|---|
| 7,253,551 B2 * | 8/2007 | Madanshetty | 310/311 |
| 7,395,827 B2 * | 7/2008 | Madanshetty | 134/184 |
| 7,518,466 B2 * | 4/2009 | Sorensen et al. | 333/32 |
| 7,626,465 B2 * | 12/2009 | Wood | 331/57 |
| 7,675,371 B2 * | 3/2010 | Wood | 331/46 |
| 7,741,921 B2 * | 6/2010 | Ismailov | 331/55 |
| 7,764,130 B2 * | 7/2010 | Wood | 331/46 |
| 7,772,746 B2 * | 8/2010 | Keolian et al. | 310/339 |
| 8,065,959 B1 * | 11/2011 | Shulte | 102/473 |
| 8,081,035 B2 * | 12/2011 | Wood | 331/45 |
| 8,093,869 B1 * | 1/2012 | Gunderson | 322/3 |
| 8,104,406 B1 * | 1/2012 | Shulte | 102/473 |
| 8,159,146 B1 * | 4/2012 | Lebens et al. | 315/291 |
| 2007/0046391 A1 * | 3/2007 | Sorensen et al. | 333/32 |
| 2007/0262676 A1 * | 11/2007 | Madanshetty | 310/311 |
| 2009/0152873 A1 * | 6/2009 | Gangopadhyay et al. | 290/1 R |
| 2011/0025139 A1 * | 2/2011 | Schulte | 310/15 |
| 2012/0018410 A1 * | 1/2012 | Zakrzewski et al. | 219/121.48 |
| 2012/0024182 A1 * | 2/2012 | Shulte | 102/363 |
| 2012/0169427 A1 * | 7/2012 | Emira et al. | 331/96 |
| 2012/0281957 A1 * | 11/2012 | Chamanzar et al. | 385/131 |
| 2012/0285934 A1 * | 11/2012 | Porteanu et al. | 219/121.36 |

* cited by examiner

POWER GENERATOR

CROSS-REFERENCE TO RELATED APPLICATIONS

This application is a continuation-in-part application of U.S. patent application Ser. No. 12/534,342 filed Aug. 3, 2009 now U.S. Pat. No. 8,203,224 for "POWER GENERATOR" the entire disclosure of which is hereby incorporated by reference.

BACKGROUND OF THE INVENTION

1. Field of the Invention

The present invention pertains to a power generator for generating electricity. More particularly, the present invention pertains to a power generator for generating electricity by resonating a gas at a high frequency.

2. Description of the Prior Art

Various types of power generators exist in the prior art which have been used for many years. For example, fossil fuel power plants which burn fossil fuels to generate electricity have been in common use for many years. Examples of such power plants burn fuels, such as methane, coal, or petroleum, to convert combustion products (e.g., heat) into mechanical motion, which is then converted to electricity. However, some of these fuels are obtained by purchase from foreign countries, and national security concerns exist as to the power which this gives to individuals of concern. Also, concerns exist among the public as to the by-products which result from burning these fuels, and there are concerns as to the world's finite supplies of some of these fuels.

In addition, nuclear power has also been used to generate electricity for over fifty years. While the development of nuclear power technology has advanced significantly since catastrophes such as Three Mile Island, such accidents have tainted the public's perception of generating electricity using nuclear power. As a result of the political hurdles that proponents of nuclear energy now face, the world's production of electricity by nuclear power has leveled off since the Chernobyl accident in 1986.

Therefore, there remains a need for a new reliable and safe power generator, or power plant, which uses a fuel source which is cheap, readily available, and renewable, and which is safe to operate and produces minimal by-products.

The present invention, as is detailed herein below, seeks to provide a new device for generating electricity by providing a power generator which resonates a gas at a high frequency.

SUMMARY OF THE INVENTION

According to the preferred embodiment hereof, the present invention provides a power generator for generating electricity comprising: (a) a core having a substantially spherical interior chamber, the interior chamber having a top portion, a bottom portion, and a lining disposed upon a surface of the interior chamber, and the core being filled with a volume of a gas; (b) a frequency generator secured to the core and configured to input a signal into the interior chamber to resonate the gas at a high frequency; (c) a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core; and (d) a plurality of conductive electron receivers connected to each of the first and second electrical conductors, the plurality of electron receivers being disposed at least partially within the lining.

In a second embodiment hereof, the present invention provides a power generator for generating electricity comprising: (a) an inner core having a substantially spherical interior chamber, the interior chamber having a top portion, a bottom portion, and a lining disposed upon a surface of the interior chamber, and the core being filled with a volume of a gas; (b) a frequency generator secured to the inner core and configured to input a signal into the interior chamber to resonate the gas at a high frequency; (c) a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the inner core; (d) a plurality of conductive electron receivers connected to each of the first and second electrical conductors, the plurality of electron receivers being disposed at least partially within the lining; and (e) an outer core having an interior chamber for housing the inner core, the interior chamber of the outer core being sufficiently large to include a void between the inner core and the outer core.

In a particular embodiment described below, the gas comprises deuterium and tritium which are fused to create helium plus a remaining extra neutron. The helium and extra neutron have much less mass than the original deuterium and tritium and the difference in mass becomes energy. The resulting free electrons exit the interior chamber via a coiled metallic wire disposed within the interior chamber for the purpose of creating lightning and high temperatures. The extra neutron carries energy into a lithium or beryllium "blanket" which lines the interior chamber. The core can also include an outer corrosive layer which may comprise lithium or beryllium as well. The extra neutron can further be used to generate energy. In the interior chamber, the neutron reacts with the lithium, creating more tritium, and the energy from the fast neutron is absorbed by the outer beryllium layer in the form of heat. A coolant, such as water, is circulated over the outer layer and heated into steam which is then used to generate turbines to create electricity. The coolant additionally acts as a barrier to trap the fast neutron (alpha particle).

In the smallest embodiments, the fast neutron is fully absorbed by the beryllium coatings and the heat is released via either anodized aluminum heatsink fins surrounding the interior chamber to cool free-air, or with a fan augmentation via free-air, or with circulating water which cools the core via a radiator and pump, free air, cooling pond, or the like.

For a more complete understanding of the present invention, reference is made to the following detailed description and accompanying drawing. In the drawing, like reference characters refer to like parts throughout the views in which:

DETAILED DESCRIPTION OF THE PREFERRED EMBODIMENT

Figure 1:
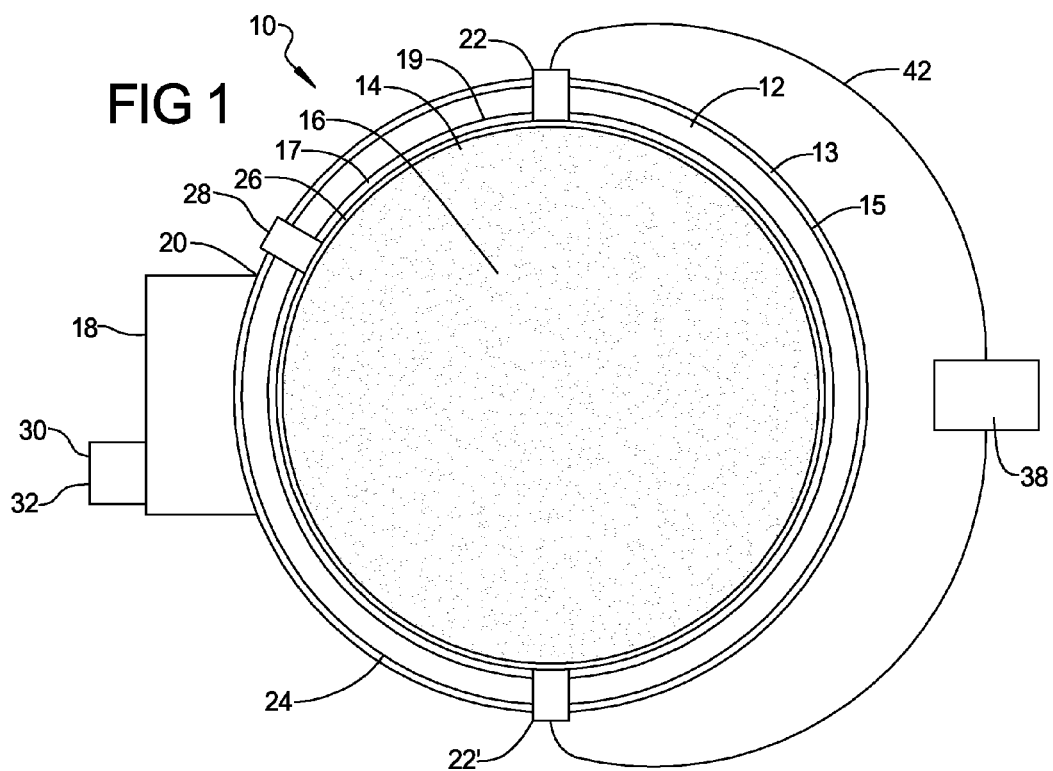
FIG. 1 is a cross-sectional view of a first embodiment of the present invention hereof.

In accordance with a first embodiment of the present invention and as shown generally in FIG. 1, there is provided a power generator 10 for generating electricity comprising a core 12 having an interior chamber 14 which is filled with a volume of a gas 16, a frequency generator 18 secured to the core 12, the frequency generator 18 provided to resonate the gas 16 at a high frequency; and a pair of electrical conductors 22,22' connected to the core 12 for conducting the generated electricity away from the core 12.

Figure 7:
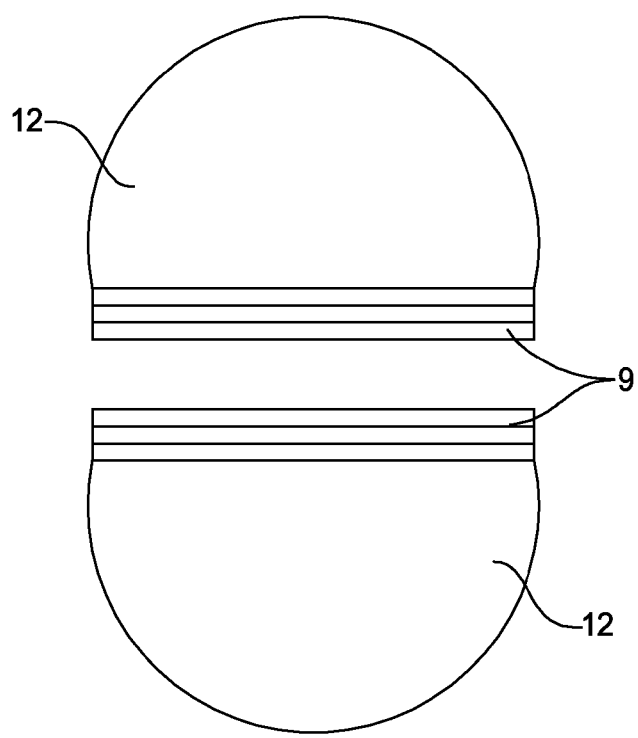
FIG. 7 shows the core comprising separate halves which are secured together via coupling threads capable of containing an internal pressure up to 2,000 psi, the core in this embodiment preferably having ½" thick walls made from solid brass and forming an interior with very little gap between the halves to provide a very smooth interior.

The core 12 includes the interior chamber 14 and an exterior 24. Although the interior chamber 14 can be any suitable shape so long as the gas 16 can achieve a standing wave resonance, it is most preferably spherical in order to achieve a "standing wave resonance" within the gas 16. A spherical configuration is preferred because it will effectuate a "standing wave resonance" within the gaseous mass of the interior 14 of the sphere, unlike a box, or torus, all of which will lead to harmonic breakdown. The exterior 24 of the core 12 can also be shaped so that the exterior 24 geometry matches that of the interior chamber 14. The core 12 comprises any suitable material which can contain the resonating gas 16 therein, and which is beneficial to the flow of electrons from the resonating gas 16 to the electrical conductors 22,22', as discussed further below. Preferably, the core 12 is comprised of a material, such as glass, ceramic, carbon fiber, metal (e.g., brass), a high-tensile strength plastic (e.g. HDPE, nylon, ABS, polycarbonate, etc.), or the like. Even more preferably, the core 12 is formed from a positively-charged magnetic material such as neodymium-iron-boron (NIB). In this regard, and as shown in FIG. 7, the core 12 can comprise two separate half-spheres which can be hermetically sealed together using suitable means such as being bolted together, being threadably sealed together 9, or the like. The significant magnetic charge of the NIB aids in sealing the halves together to hermetically seal the core 12 under very high internal pressure.

In this preferred embodiment, the core 12 can include a thick outer corrosive layer 13 on the exterior surface 15 and a thick inner corrosive layer 17 on the interior surface 19 of the core 12 to absorb neutrons, to trap or reflect Alpha particles, and to withstand high temperatures. The inner corrosive layer 13 is preferably formed from beryllium or Lithium 7. The outer corrosive layer 17 can comprise zinc chromate or any other suitable high-temperature corrosion-proof coating to circulate coolant water over.

The size of the core 12 can be any dimension which is suitable for use with a particular embodiment (as discussed further below). However, when the interior chamber 14 is a sphere, then the radius is preferably an even-numbered divisible of $\pi$ (i.e., 3.14159265 . . . ) or $\Phi$ (i.e., 1.6180339 . . . ), or a close approximation thereof. The size of the core 12 as used in various applications is discussed further below.

The interior chamber 14 of the core 12 is preferably covered with a lining 26 to facilitate the flow of electrons to the electrical conductors 22,22'. The lining 26 comprises any suitable material which can withstand high temperatures and preferably has dielectric properties. Even more preferably, the lining 26 is a conductive silicon which can function like a solar panel to collect electrical charge. As described in further detail below, exposed strands of wiring can be embedded into the silicon coating lining 26 to facilitate improved production of plasma via lightning about the ends of the wire strands which additionally serve to collect the free electrons released but the fusion reaction.

The lining 26 can also operate like a capacitive conductor, for instance, the lining 26 preferably can hold an electric charge, and then release that charge to a conductive material once it has reached a supersaturated state. Accordingly, the lining 26 can comprise a material such as a fluoropolymer sold under the trademark Teflon®, a polyimide film sold under the trademark Kapton®, or like materials having similar conduction and heat-resistance properties. The lining 26 can also comprise materials such as glass, mirrored glass, vanadium, or the like.

The core 12 can include a sealed entry 28 for accessing the interior chamber 14 for both inserting the gas 16 and for removing reaction by-products. The entry 28 can comprise a hinged locking door which is properly insulated, a removable panel, a pierceable gasket, or any other suitable entry for introducing gas 16 into the interior chamber 14 and removing any by-products as necessary. When the entry 28 is a pierceable gasket, the gas 16 can be introduced into the interior chamber 14 by injecting it using a needle or similar means.

Figure 8:
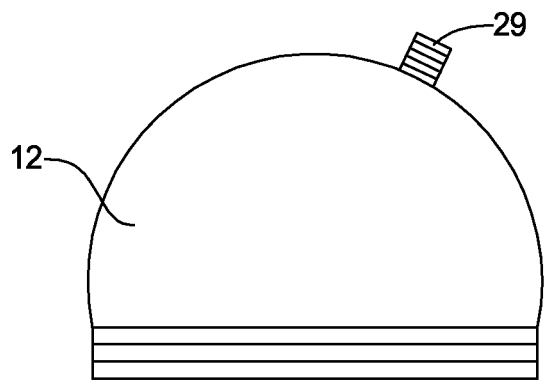
FIG. 8 shows a half of the core including a valve stem assembly threadably secured to the core in which the valve stem assembly does not protrude into the interior of the core, and is capable of withstanding and containing pressures up to 2,000 psi within the core.
Figure 9:
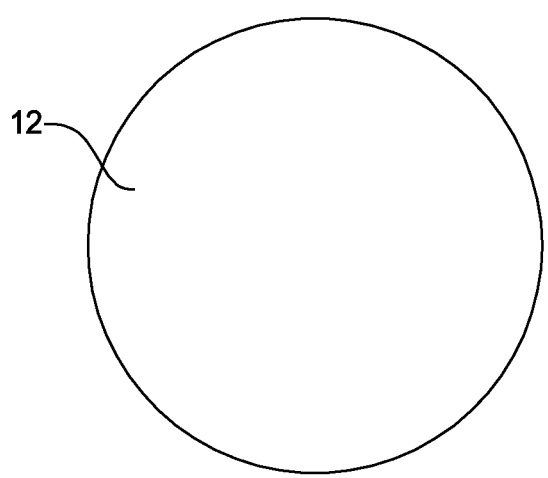
FIG. 9 shows an exemplary embodiment of the core having an internal diameter equal to the ten thousandths decimal place of $\pi$, that is, 3.1415", and having a smooth inside surface which is preferably polished to a shine.

For purposes which will be discussed in further detail below, the interior chamber 14 is filled with the volume of a gas 16. The gas 16 is preferably pressurized at a pressure greater than atmospheric pressure. Although any suitable gas can be used, the gas 16 is preferably a flammable light gas such as hydrogen or methane. Even more preferably, the gas 16 is Deuterium and/or Tritium. The gas 16 is introduced into the core 12 either during assembly of the power generator 10, or via the sealed entry 28, if provided, while the power generator 10 is not in use. In addition, the power generator 10 can be plumbed with gas lines (not shown) to continuously (or periodically) pump more gas 16 into the core 12. For example, when the gas 16 is methane, the gas 16 can be pumped in from methane-producing sources, such as landfills, farms, and so forth, thereby fueling the power generator 10 with a completely renewable source. Before filling the interior chamber 14 with the gas 16, all air can be removed from the interior chamber 14 to create a vacuum. The interior chamber 14 can then be filled with the gas 16. As shown in FIG. 8, to facilitate with filling, emptying, and vacuuming out all of the air and gas contents, the core 12 can include a valve stem assembly 29 in fluid communication with the interior chamber 14. The valve stem assembly 29 includes a threaded connection, nozzle, or other suitable structure for connection with a tank or hose for eliminating air from, or delivering gas 16 to, the interior chamber 14. Preferably the valve stem assembly 29 is of the type known for use in automobiles.

The power generator 10 also includes a frequency generator 18 for resonating the gas 16 at a high frequency. The frequency generator 18 resonates the gas 16 molecules at an amplitude and frequency sufficient to resonate the gas 16 molecules at a single peak intensity, or a "standing wave resonance." The frequency generator 18 is any suitable type of frequency generator known in the art, such as a traveling-wave tube, a magnetron, a gyrotron, a klystron, or the like. Preferably, the frequency generator 18 is capable of outputting consistently in a narrow band of radio frequency or microwave frequency electromagnetic wavelength regions to resonate the gas 16. In some embodiments, the frequency generator 18 may preferably be pulsed ON and OFF at a high rate, for instance, 5-10 times per second. The type of frequency generator used will be dictated, in part, by the size of the power generator 10 deployed for any particular application. In order to sufficiently resonate the gas 16, the frequency generator 18 preferably produces a frequency of at least or about 1 THz. The frequency generator 18 is attached to the power generator 10 as described below.

Figure 11:
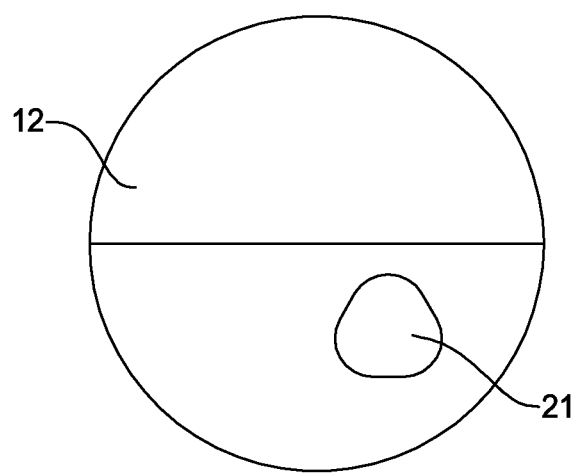
FIG. 11 shows an exemplary core including an access window for delivering an RF signal into the core, the access window being about 1" thick transparent Lexan® that fits into and forms a hermetic seal with the wall of the core, the access window preferably having the same thickness as the sphere wall, and being sealed in place using adhesives or other suitable sealants to withstand pressure within the core of up to 2,000 psi.

As shown in FIG. 11, an access window 21 can additionally be provided to ensure that the core 12 remains hermetically sealed, yet allows the signal provided by the frequency generator 18 to pass therethrough. The access window 21 can comprise a transparent panel formed from a material such as a polycarbonate resin thermoplastic sold under the trademark Lexan®. The access window 21 is dimensioned and fitted with the core to provide a hermetic seal with the interior chamber 14. Preferably, the access window 21 is inserted from the inside of the core 12, and is precisely engineered and manufactured perfectly seal against the interior wall of the core 12. Gaskets can be provided as necessary between the access window 21 and the core 12 to ensure that the interior chamber 42 remains pressurized.

A power source 30 for operating the frequency generator 18 is also provided. The power source 30 can be a DC battery, an AC outlet, or the like. In addition, the power generator 10 itself can provide the power necessary to operate the frequency generator 18, so long as an auxiliary power source (not shown), such as a battery, is provided to initially power the frequency generator 18 until the power generator 10 has produced sufficient electricity to become self-operational. The power source 30 can be connected to the frequency generator 18 by an electrical circuit, such as a switch 32, to allow the power generator 10 to be turned on or off.

Figure 2:
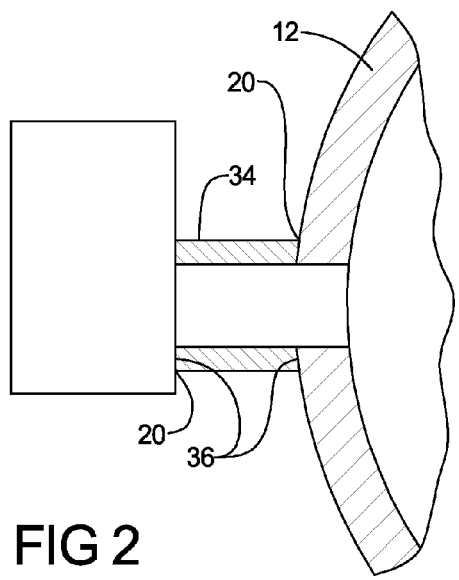
FIG. 2 is an enlarged cross-sectional view of a waveguide and the means for attaching the frequency generator to the core.

As shown in FIG. 2, the present invention can also include a waveguide 34 for directing the extracted RF energy from the frequency generator 18 to the interior chamber 14 of the power generator 10. The waveguide 34 is a structure which guides a wave, such as an electromagnetic wave. The waveguide 34 can be formed from a material, such as cast brass or bronze, which is typically used for microwave oven apertures. The waveguide 34 is tuned for exact dimension based upon the frequency of the RF wavelength emitted. It is preferably rectangular in cross-section, however a round TWT traveling wave tube emission can also be employed. It is also noted that the waveguide 34 is not required, as the frequency generator 18 can emit electromagnetic waves directly into the core 12 of the interior chamber 14.

When a waveguide 34 is provided, means for securing 20 can be provided to attach the waveguide 34 to both the frequency generator 18 and the core 12. The means for securing 20 includes fasteners such as bolts, welding, or the like.

The core 12, frequency generator 18, and waveguide 34 are hermetically sealed together in order to contain the pressurized gas 16. A plurality of gaskets 36 suited for high pressure applications is provided to ensure that the gas 16 remains pressurized within the interior chamber 14 of the core 12. At least one gasket from the plurality of gaskets 36 is provided as required between each of the core 12 and the waveguide 34, as well as between the waveguide 34 and the frequency generator 18. When the core 12 comprises separate half-spheres of NIB, at least one gasket from the plurality of gaskets 36 is provided to provide a hermetic seal between the halves.

It is to be appreciated by one having ordinary skill in the art that the gas 16 may not escape while under pressure and that the plurality of gaskets 36 is provided because the pressurized gas 16 must be properly contained within the power generator 10. Each of the gaskets in the plurality of gaskets 36 is formed from any suitable type of material known in the art for providing a hermetic seal, such as an elastomer.

Lightning within a microwave oven is a phenomena witnessed by most people when a metallic object, such as a spoon or fork, is accidentally placed within the microwave. During operation of the microwave, lightning and arcing are created about the metallic object. Likewise, in use, the frequency generator 18 resonates the gas 16 molecules to a resonant standing wave, thereby turning the gas 16 into a hot plasma having high surface tension and high surface temperatures to fuse nuclei together and strip the atoms of electrons and neutrons, thereby allowing the gas 16 molecules' electrons to become free flowing within the plasma.

The power generator 10 also includes a pair of electrical conductors 22,22' for conducting the free electrons from the interior chamber 14 to an output 38. Preferably the electrical conductors 22,22' are spaced apart and opposed from each other, and have opposite polarity to each other. Three or more electron conductors can optionally be provided as well.

As such, the free electrons in the resonating gas 16 are naturally attracted to the oppositely-charged electrical conductor, 22 or 22', thereby facilitating the flow of electricity as described further below. Each of the electrical conductors 22,22' have both a structure and a material-type which can conduct electricity from the interior chamber 14 to the exterior 24 of the core 12. For example, the conductors 22,22' can be directly embedded and attached to the lining 26. In addition, the electrical conductors 22,22' can comprise rods extending from the interior chamber 14 to the exterior 24 of the core 12. Preferably the rods comprise a non-metallic material, such as graphite or carbon. Any type of material which can conduct electricity and operate at high-temperatures is suitable for use as an electrical conductor.

Alternatively, rather than the pair of electrical conductors 22,22' (or in addition thereto), magnetic, or inductive, pickup coils (not shown) can be provided to conduct the free electrons from the interior chamber 14 to the output 38. The inductive pickup coil can be any suitable type, such as a permanent magnet wrapped in a conductive coil. The inductive pickup coil can be embedded in a conductive coil and secured on the outside of the coil and/or within the core 12, such that electricity is conducted to and/or generated in the inductive pickup coil when the gas reaches a standing wave resonance within the core 12.

Figure 3:
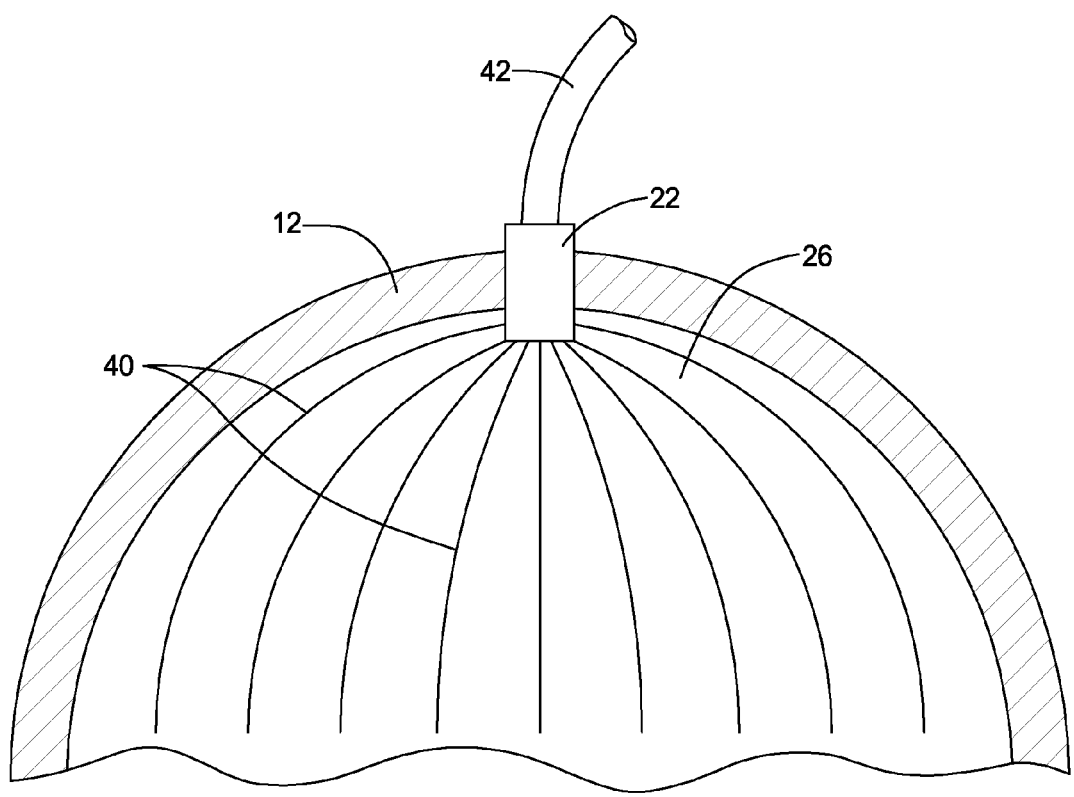
FIG. 3 is an enlarged cross-sectional view showing an embodiment of the plurality of electron receivers disposed on the interior chamber lining.

As shown in FIG. 3, a plurality of electron receivers 40 can be provided to attract and conduct the free electrons from the resonating gas 16 to at least one of the electrical conductors 22 or 22' to further aid in the flow of electricity. The plurality of electron receivers 40 can be in electrical connection with at least one of the electrical conductors, 22 or 22', for the purpose of attracting free electrons from the resonating gas 16 and conducting those electrons to a respective one of the electrical conductors, 22 or 22'. The plurality of electron receivers 40 are formed from a conductive material such as carbon fiber, beryllium-copper, iridium, silicon, or other suitable conducts like metal. It is understood by one having ordinary skill in the art that the type of material chosen will be affected by factors such as the operating temperatures reached within the interior chamber 14 for the particular application. The plurality of electron receivers 40 can be an array of conductive wires (which can optionally be frayed), a conductive film, web, matrix, and so forth which assists in attracting and conducting the free electrons from the plasma to at least one of the electrical conductors 22 or 22'. The plurality of electron receivers 40 can be oriented to penetrate from the outside of the core 12 into the interior chamber 14 to effectuate lightning and arcing on a tiny but widespread scale over the entire inner surface of the spherical core 12. This activity will strip electrons out of the plasma created by microwave standing wave resonance acting upon the exposed electron receivers, or wiring, inside the magnetic spherical core 12.

Figure 10:
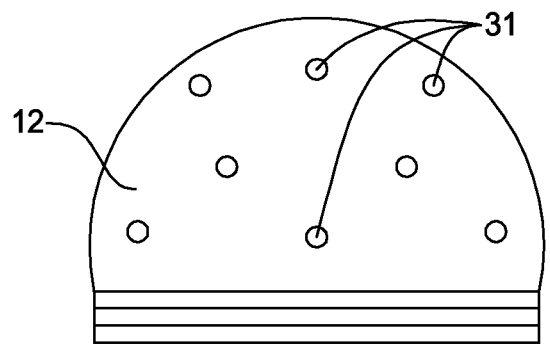
FIG. 10 show an exemplary half of the core including a plurality of holes (8 shown) staggered through the wall of the half-sphere, each hole being electrically insulated from the sphere with Teflon®, nylon, or a similar insulator to electrically and thermally separate the metallic wire passing therethrough from the brass sphere.

As shown in FIG. 10, each electron receiver from the plurality of electron receivers 40 extends through a respective hole from a plurality of holes 31 (8 shown) staggered through the wall of the half-sphere, each hole being electrically insulated from the core 12 with Teflon®, nylon, or a similar insulator to electrically and thermally separate the respective metallic conductive wire electron receiver passing therethrough from the brass core 12.

When the power generator 10 is for particularly small applications, the plurality of electron receivers 40 can comprise only a small number of wire strands protruding into the interior chamber 14. The plurality of electron receivers 40 can be imbedded within, or disposed on, the lining 26 on the interior chamber 14, such as found on a solar panel, and having the ends of each electron receiver being exposed to conduct electricity. The electron receivers 40 are preferably formed from a material which is conductive and resistant to high temperatures, such as certain metals. Furthermore, the plurality of electron receivers 40 can have portions which are exposed to the resonating gas 16 to attract free electrons, or any other configuration which will serve the purpose thereof. During use, the resonating gas 16 will turn into a plasma, and the free elections will cause electrical current to arc between the electron receivers 40 which are in connection with the respective electrical conductors 22,22'. In this regard, the plasma will provide an electrical pathway for the electrons to flow through the power generator 10.

The electrical conductors 22,22' conduct electricity to an output 38, such as a DC battery, a step-up transformer, or any other suitable type of electrical receiver which is used for storing, converting, and/or transmitting electrical current. The output 38 is connected to at least one of the electrical conductors, 22 or 22', by any suitable means for conducting 42 which is well know in the art, such as insulated copper wiring.

Figure 4:
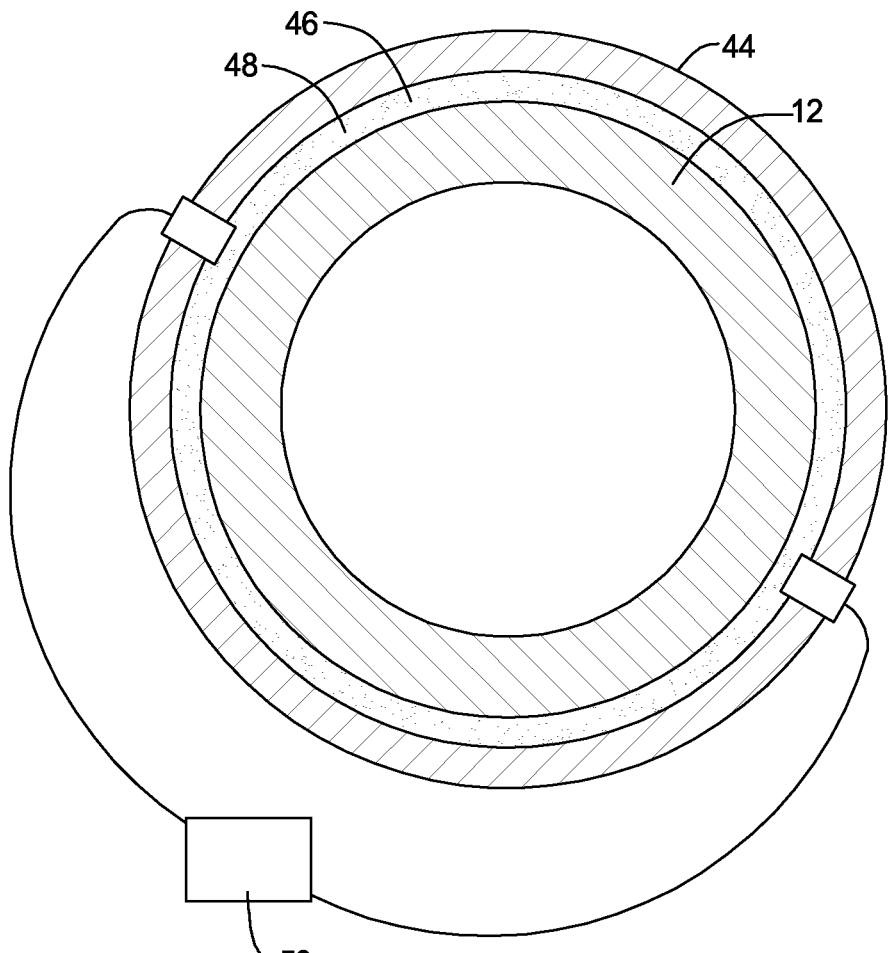
FIGS. 4 and 5 are cross-sectional views showing an embodiment including an enlarged second core for housing and protecting the core.
Figure 5:
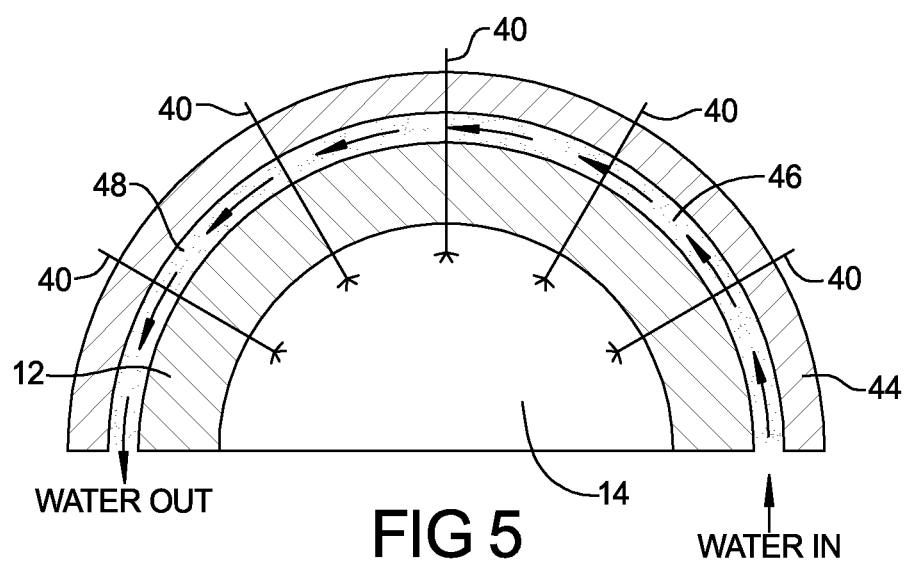

As shown in FIGS. 4 and 5, optionally an enlarged second core 44 having an enlarged interior chamber 46 can be provided to contain the core 12. The interior chamber 46 is large enough to house the core 12, and is provided to assist in cooling the core 12 during use. The core 44 is also provided for additional shielding and protection to the core 12. The core 44 is preferably formed from a high temperature non-radioactive material, such as coated beryllium, anodized beryllium, or aluminum-coated beryllium. The interior chamber 46 can contain a coolant fluid 48, such as water, for circulation through the interior chamber 46 and around the core 12 to remove heat therefrom. The coolant fluid 48 is preferably one which is good at trapping neutrons, or Alpha particles. Thus, the core 44 can also comprise means for cooling and circulating 50 the coolant, which can include piping, pumps, means for cooling, and any other suitable elements for circulating cooled coolant fluid 48 through the interior chamber 46. The means for cooling can comprise a refrigeration unit, a radiator, a cooling pond, and so forth.

It is also contemplated that the present invention can be used in a manner to purposefully heat a fluid (e.g., water) passing over the core 12 for the purpose of creating steam to drive a turbine (not shown), and thus produce electricity.

Figure 6:
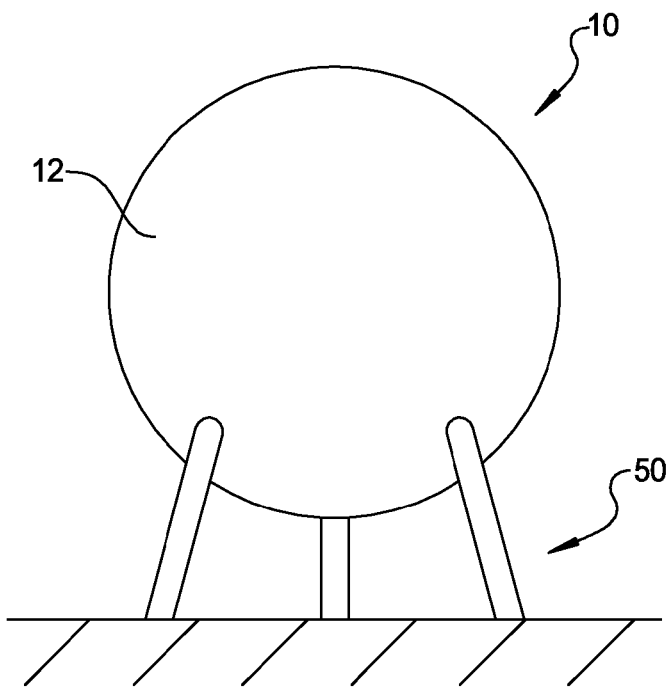
FIG. 6 shows an embodiment including means for isolating the power generator from vibration.

As shown in FIG. 6, the power generator 10 can also be provided with means for isolating 50 the power generator 10 from external vibration. The means for isolating 50 can comprise a foundation such as a base or plurality of feet which can be supported by springs, shock absorbers, shock-absorbing elastomers such as the type sold under the trademark Sorbothane®, any suitable type of visco-elastic material, or the like.

It is to be appreciated by one having ordinary skill in the art that the present invention is scalable in size for various applications, as needed. For instance, the present invention can be used to provide electricity in: small-scale applications, such as laptop computers or small household appliances for which portability is desired; medium-scale applications, such as for electric cars or for household-wide electrical production; or large-scale applications, such as providing electricity to entire buildings, or as a power plant for entire cities. Small capacity power generators, such as used with laptops, can comprise a core 12 formed from two half spheres sandwiched between two halves of an aluminum block. The aluminum block can include heatsink fins cast into the aluminum block for additional free-air cooling.

The frequency generator 18 can comprise a traveling-wave tube when the present invention is used with small-scale applications. A traveling-wave tube, or TWT, is an electronic device used to amplify radio frequency signals to high power. A TWT can produce frequencies in the range of 300 MHz to 50 GHz. A TWT is an elongated vacuum tube with a heated cathode that emits electrons at one end. A magnetic containment field around the tube focuses the electrons into a beam, which then passes down the middle of a wire helix that stretches from the RF input to the RF output, the electronic beam finally striking a collector at the other end. A directional coupler, which can be either a waveguide 34 or an electromagnetic coil, is fed with the low-powered radio signal that is to be amplified, and is positioned near the emitter, and which induces a current into the helix. The helix acts as a delay line in which the RF signal travels at approximately the same speed along the tube as the electron beam. The electrons are "bunched" together as the electromagnetic field interacts with the electron beam due to the current in the helix. The electromagnetic field then induces more current back into the helix.

In this embodiment, a solid state having an RFI source providing a frequency in the range of about 2.4 GHz to about 5.8 GHz or higher is provided by the TWT. The TWT emits the frequency into the interior chamber 14 which is filled with the gas 16, preferably, hydrogen. The gas 16 is pressurized within the core 12, at a pressure of up to or greater than, 100 psi, or even up to or greater than 50 Atm. The mass of the gas 16 in this embodiment may be as small as 0.01 gram to provide electricity to a battery such as found in a laptop computer, although it may be larger.

When the present invention is used for medium-scale applications, the frequency generator 18 preferably comprises a magnetron.

A magnetron is a high-powered vacuum tube that generates non-coherent microwaves. A magnetron consists of a hot filament, or cathode, which is kept at or pulsed to a high negative potential by a high-voltage, direct-current power supply. The cathode is built into the center of an evacuated, lobed, circular chamber. A magnetic field parallel to the filament is imposed by a permanent magnet. The magnetic field causes the electrons, which are attracted to the positively charged outer portion of the chamber, to spiral outward in a circular path rather than moving directly to the positive anode. Spaced around the rim of the chamber are cylindrical cavities. The cavities are open along their length and connect the common chamber space. As electrons sweep past these openings they induce a resonant, high-frequency radio field in the chamber, which in turn causes the electrons to bunch into groups. A portion of this field is extracted with a short antenna that is connected to the waveguide 34.

Medium-sized applications require an output from the frequency generator 18 in the range of about 500 Watts to about 1500 Watts. A very narrow bandwidth RF output from the frequency generator 18 is emitted directly into the interior chamber 14 via the waveguide 34. The frequency generator 18 and waveguide 34 are hermetically sealed to the core 12. In this embodiment, the gas 16 is at a pressure of about 100 psi or higher, and the mass of the gas 16 can be as small as 0.5 gram, although it may be larger.

The power generator 10 for medium-sized applications, such as a portable generator and a generator equipped to provide electricity to an entire home, can provide an output of about 1500 Watts to about 50,000 Watts of continuous output.

When the present invention is used for large-scale applications, the frequency generator 18 comprises a gyrotron or a klystron.

A gyrotron is a high-powered vacuum tube which emits millimeter-wave beams by bunching electrons with cyclotron motion in a strong magnetic field. Output frequencies range from about 20 GHz to about 250 GHz, and gyrotrons can be designed for pulsed or continuous operation. A gyrotron is a type of free electron MASER (Microwave Amplification by Stimulated Emission of Radiation). It has high power at millimeter wavelengths because its dimensions can be much larger than the wavelength, unlike conventional vacuum tubes, and it is not dependent on material properties, as are conventional MASER's. Gyrotrons are often used to heat plasmas.

A klystron is a specialized linear-beam vacuum tube. Klystrons are used as amplifiers at microwave and radio frequencies to produce both low-power reference signals for superheterodyne radar receivers and to produce high-power carrier waves for communications. They are the driving force for modern particle accelerators. Klystron amplifiers have the advantage over the magnetron of coherently amplifying a reference signal so its output may be precisely controlled in amplitude, frequency, and phase. Klystrons have an output in the range of 50 megawatts at frequencies nearing 3 GHz. Many klystrons have a waveguide for coupling microwave energy into and out of the device, although it is also quite common for lower power and lower frequency klystrons to use coaxial couplings instead. In some cases a coupling probe is used to couple the microwave energy from a klystron into a separate external waveguide. Klystrons operate by amplifying RF signals by converting the kinetic energy in a DC electron beam into radio frequency power. A beam of electrons is produced by a thermionic cathode (a heated pellet of low work function material), and accelerated by high voltage electrodes (typically in the tens of kilovolts). This beam is then passed through an input chamber. RF energy is fed into the input chamber at a voltage or amplitude which is at, or near, the natural frequency of the gas 16 to excite the molecules of the gas 16. The electric field causes the electrons to bunch because electrons which pass through during an opposing electric field are accelerated while later electrons are slowed; thereby causing the previously continuous electron beam to form bunches at the input frequency. The RF current carried by the beam will produce an RF magnetic field, and this will in turn excite a voltage across the gap of subsequent resident activities. In the output chamber, the developed RF energy is coupled out. The spent electron beam, with reduced energy, is then captured in a collector.

Large-sized applications require an output from the frequency generator 18 in the range of about 1500 Watts or greater. The frequency generator 18 can emit the RF output directly into the interior chamber 14 via the waveguide 34. The frequency generator 18 can also be directly attached to the core 12 to directly emit the RF output into the core 12. The frequency generator 18 and waveguide 34 are hermetically sealed to the core 12. The interior chamber 14 of the core 12 is filled with the gas 16 pressurized to about 100 psi or higher. The mass of the gas 16 in this embodiment may be as small as 1 pound, although it may be sufficiently larger so that the power generator can provide adequate electricity for an entire metropolis, an industrial center or manufacturing plant, a naval warship, a submarine, and so forth.

The power generator 10 for large-sized applications, such as for powering industrial buildings, naval or space vessels, or to provide power to the national power grid, would provide an output of about 1500 megaWatts or more, depending upon the volume of the interior chamber 14.

In order to ensure that the power generator 10 operates at a proper temperature for peak performance and efficiency, other means for cooling can be provided as well. The means for cooling can be embodied by various structural elements. For instance, in small-scale applications such as in a laptop computer, the means for cooling can comprise the power generator 10—including the core 12 and frequency generator 18—being surrounded and embedded within an outer shell, such as a metal "strong box," to maintain both the integrity of the power generator 10 and to act as a heatsink. The means for cooling in such small-scale applications can comprise a cast metal "clamshell" type box having a top and a bottom half which are secured together by fasteners, such as screws. A gasket made from a heat conductive material can be secured between the halves of the box. In such an application, the means for cooling can be formed from metals having excellent thermal conductivity properties, such as molybdenum, molybdenum copper, tungsten, tungsten copper, and the like.

In medium-scale applications, the means for cooling can comprise heatsink fins attached directly to the exterior 24 of the core 12. The fins are formed from a material having a high thermal conductivity, such as metal. Preferably the metal used is aluminum, copper, or the like. The fins are affixed to the core 12 by a method which is conducive to the transfer of heat from the core 12 to the means for cooling, such as welding (when appropriate according to material types), fasteners (along with thermally conductive gaskets or grease), and so forth. An automated temperature control system (not shown) can be provided to operate the means for cooling to regulate the temperature of the core 12. The temperature control system can include at least one temperature sensor (e.g., a thermistor, thermocouple, etc.), means for effectuating the flow of a fluid over the fins (e.g., a fan), and a controller (e.g., processor, CPU, etc.) for turning the means for effectuating flow on and off to regulate the temperature of the core 12 within a preferable range.

In large-scale applications, the means for cooling can comprise the core 12 having a system of passageways through which a coolant may flow, such as found in the cooling system for an engine block. A coolant pump for circulating the coolant and means for cooling the coolant can also be provided. An automated system, such as described above, can be provided to ensure that the power generator 10 operates within a desired temperature range.

It is to be appreciated by one having ordinary skill in the art that by varying the amplitude of the frequency emitted into the chamber 14, the flow of electricity can correspondingly be adjusted, stopped entirely, or set to a low amount such as to provide a trickle charge to produce MeV directly off of the conductive lining 26 and/or carbon or metallic wires and/or inductive pickup coils. It is anticipated that when the frequency generator 18 produces a frequency in the range of about 2.4 GHz, the resonated gas 16 will develop an inertia against itself at a very high rate, higher than 1 trillion times per second due to the unique properties of the spherical core 12. This high rate of resonance will maximize density over time, rather than a laser THz AC sine wave or lesser microwave GHz frequency that will not achieve as high density over time, which would prevent any fusion reactions from occurring or at best operate with reduced efficiency of the reactor. A higher frequency standing wave resonance harmonic develops from the unique wave propagation and interaction phenomena of the spherical chamber 14. A frequency of about 2.4 GHz emitted by the frequency generator 18 will effectuate lightning and arcing across the ends of the plurality of electron receivers 40 (e.g., the ends of frayed out wires protruding into the interior chamber 14). The amplitude of the signal is adjusted accordingly for the volume of the interior chamber 14. The geometry of the interior chamber 14 creates a dominant radio frequency standing wave resonance to develop within the gas 16 due to the unique wave propagation and interaction properties of the chamber 14 when driven with sufficient amplitude in the radio frequency domain.

One having ordinary skill in the art will also understand that the cubic volume of the spherical chamber 14 should be properly mated to the actual amplitude, or wattage, of the signal produced by the frequency generator 18. The objective is to produce a high rate of vibration (or resonance) within the gas 16 rather than to produce heat.

Optionally, the power generator can include at least two frequency generators which are preferably identical and synced to provide simultaneous RF outputs. The synced RF outputs are synchronized via a Phase-Locked-Loop (PLL) driving circuit which preferably perfectly synchronizes the simultaneous RF outputs in terms of frequency, amplitude, and phase. The at least two frequency generators emit through identical apertures and waveguides and/or traveling wave tubes into the interior chamber of the core. The at least two frequency generators are secured and oriented to the core such that they aim their RF output to intersect at a focal point inside the interior chamber. The focal point is preferably located near the middle of the interior chamber.

According to a preferable embodiment of the present invention, the core 12 can comprise two separate half-spheres which can be secured together. The core 12 can comprise any suitable type of material including metals or composites, but preferably the core 12 is formed from brass. The half-spheres are sufficiently secured together to withstand and maintain pressures up to 2,000 psi within the interior chamber 14. The interior chamber 14 can house at least one gas 16, which is preferably Deuterium and/or Tritium. The inner lining 26 is coated with lithium and/or beryllium, and the outer corrosive layer 17 is coated with beryllium or any other suitable anti-corrosive coating when the core 12 is intended to be cooled by water passing over the exterior surface of the core 12.

Beryllium is selected as a material because it can trap particles released during the fusion process and prevent them from escaping the core 12, which would make objects outside the core 12 and the power generator radioactive over time. Beryllium is a preferred material because it is not corrosive.

Lithium (e.g., lithium 3, 5, or 7) is selected as a possible material for the inner lining 26 because it reacts with certain gases, such as Tritium, to create more Tritium, thereby allowing a gas 16 fuel mixture to last longer in the reaction before needing to be evacuated and replaced with a fresh, pure Deuterium/Tritium mixture. Lithium also traps Alpha particles and high energy neutrons.

This embodiment can also include means for resonating placed or affixed within the interior chamber 14. The means for resonating can comprise glass, metal, crystal, ceramic, composite, or any suitable shape like a horn, a flare, a cylinder, a bell, etc. which will effectuate the RF resonance such as "ringing" and lightning production caused by the RF energy striking the means for resonating causing it to ring forming lightning and arcing and flame. The means for resonating can be wrapped, coiled, embedded, or otherwise in close contact with high-temperature resistant wire, metal ribbon, vapor-deposited metal onto the means for resonating to facilitate or affect the RF resonances or resonances within or upon the metal(s) that result in the lightning/flame/sparks/high temperature being created. The metal can comprise, but is not limited to, tungsten, nickel chrome, iridium, and so forth.

Referring back the present invention in generally, the resulting higher frequency harmonic wave resonance will effectuate fusion in tandem with the small, localized lightening that will occur around and about the ends of the frayed wires. Millions of atomic-level fusion reactions will continuously occur within the plasma surrounding the ends of the frayed wires, as long as the microwave driving frequency is admitted into the interior, either pulsed at a measured rate or continuously, depending on the reactor output required. The wires may be carbon fiber, silicon, copper, iridium, or any other suitable material that is determined to hold up over a long period of time during continuous use.

It is to be appreciated by one having ordinary skill in the art that the lightning and arcing inside the core 12 will rapidly product a hot plasma and high surface tension and high surface temperatures required to fuse nuclei together and strip the atoms of electrons and neutrons. At that same time, providing an electrical pathway for the electrons to charge a battery, MeV inverter, supercapacitor, or similar device. A diode arrangement can be provided to prevent reverse flow of electrical discharge. The collecting wires can be frayed out like carpeting, or in the case of very small-sized spheres for batteries, just a small number of wire strands can protrude into the interior of the core 12. The collecting wires can run through the wall of core 12 using high-pressure gaskets and seals to contain the gasses under pressure and to collect stripped electrons that are released during the fusion-plasma process.

The resulting higher frequency harmonic wave resonance will effectuate fusion in tandem with the small localized arcing, or lightning, which will occur around and about the ends of the frayed wires from the plurality of electron receivers 40. Millions of atomic level fusion reactions will continuously occur within the plasma surrounding the ends of the frayed wires, as long as the microwave driving frequency from the frequency generator 18 is submitted into the interior chamber 14 (either pulsed at a measured rate or continuous), depending on the reactor output required.

When the core 12 is formed from a magnetic material, the invention provides a magnetic core 12 filled with a radio frequency to effectuate a standing wave harmonic resonance for magnetic confinement and inertial confinement.

The microwave NIB-Beryllium sphere design will effectuate cold fusion with the wired "lightning" version pulsed by a high frequency microwave source in the GHz-THz region, or hot fusion in the non-wired version which is not pulsed, but over driven by a powerful microwave source which is run constantly to heat water to run a steam turbine which is connected to a common electrical power generator in use today. The generator can be driven by any suitable radio frequency up to and including 1 THz, including the range of 2.4-2.6 GHz, which is the most common range for microwave oven generators.

Although various embodiments of the invention have been disclosed for illustrative purposes, it is understood that one skilled in the art can make variations and modifications without departing from the spirit of the invention.

What is claimed is:

1. A power generator for generating electricity comprising:
    (a) a core having a substantially spherical interior chamber, the interior chamber having a top portion, a bottom portion, and a lining disposed upon a surface of the interior chamber, and the core being filled with a volume of a gas;
    (b) a frequency generator secured to the core and configured to input a signal into the interior chamber to resonate the gas at a high frequency;
    (c) a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core; and
    (d) a plurality of conductive electron receivers connected to each of the first and second electrical conductors, the plurality of electron receivers being disposed at least partially within the lining.

2. The power generator of claim 1 in which the core comprises neodymium-iron-boron, wherein the core is filled with a radio frequency to effectuate a standing wave harmonic resonance for magnetic confinement and inertial confinement.

3. The power generator of claim 1 wherein the lining comprises a conductive silicon.

4. The power generator of claim 1 wherein the gas is deuterium.

5. The power generator of claim 1 wherein the gas is tritium.

6. The power generator of claim 1 wherein the frequency of the signal is about 1 THz.

7. The power generator of claim 1 wherein the core comprises two separates halves which are secured together and hermetically sealed to each other.

8. The power generator of claim 1 wherein the core comprises an exterior surface coated with an outer corrosive layer, and an interior surface coated with an inner corrosive layer.

9. The power generator of claim 8 wherein the outer corrosive layer comprises zinc chromate, and the inner corrosive layer comprises a material selected from the group of beryllium and lithium-7.

10. The power generator of claim 1 wherein the core comprises a sealed entry for inserting the gas.

11. The power generator of claim 10 wherein the sealed entry comprises a pierceable gasket.

12. The power generator of claim 1 wherein the plurality of electron receivers comprises a plurality of ends which are conductively exposed.

13. The power generator of claim 12 wherein the core comprises an exterior surface coated with an outer corrosive layer, and an interior surface coated with an inner corrosive layer.

14. The power generator of claim 13 wherein the outer corrosive layer comprises zinc chromate, and the inner corrosive layer comprises a material selected from the group of beryllium and lithium-7.

15. A power generator for generating electricity comprising:
    (a) an inner core having a substantially spherical interior chamber, the interior chamber having a top portion, a bottom portion, and a lining disposed upon a surface of the interior chamber, and the core being filled with a volume of a gas;
    (b) a frequency generator secured to the inner core and configured to input a signal into the interior chamber to resonate the gas at a high frequency;
    (c) a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the inner core;
    (d) a plurality of conductive electron receivers connected to each of the first and second electrical conductors, the plurality of electron receivers being disposed at least partially within the lining; and
    (e) an outer core having an interior chamber for housing the inner core, the interior chamber of the outer core being sufficiently large to include a void between the inner core and the outer core.

16. The power generator of claim 15 wherein the void comprises a coolant for cooling the inner core.

17. The power generator of claim 16 comprising means for cooling and circulating the coolant.

18. The power generator of claim 16 wherein the coolant is water.

19. The power generator of claim 15 wherein the outer core comprises two separates halves which are secured together and hermetically sealed to each other.

20. The power generator of claim 15 wherein the plurality of electron receivers comprises a plurality of ends which are conductively exposed.

21. A power generator for generating electricity comprising:
    (a) a core being formed from two substantially spherical halves and having a substantially spherical interior chamber, the interior chamber having a top portion, a bottom portion, and a lining disposed upon a surface of the interior chamber, and the core being filled with a volume of a gas;
    (b) a frequency generator secured to the core and configured to input a signal into the interior chamber to resonate the gas at a high frequency;

(c) a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core; and (d) a plurality of conductive electron receivers connected to each of the first and second electrical conductors, the plurality of electron receivers being disposed at least partially within the lining.

22. The power generator of claim 21 wherein the core comprises a metal material.

23. The power generator of claim 22 including means for resonating at a high frequency to create arcing of electricity.

24. The power generator of claim 23 wherein the signal is pulsed on and off.

25. The power generator of claim 24 wherein the signal is pulsed on and off at a rate of at least five times per second.

26. The power generator of claim 22 including a valve stem secured to the core and being in fluid communication with the interior chamber to facilitate adding and removing the gas from the interior chamber.

27. The power generator of claim 22 wherein the core includes a hermetically-sealed access window positioned between the interior chamber and the frequency generator, whereby the access window allows the signal to pass from the frequency generator into the interior chamber, yet maintains the gas at a pressurized state within the core.

28. The power generator of claim 22 wherein the core comprises brass.

29. The power generator of claim 28 wherein the signal is pulsed on and off.

30. The power generator of claim 22 wherein the gas comprises deuterium.

31. The power generator of claim 30 wherein the gas comprises tritium.

32. The power generator of claim 22 wherein the gas comprises tritium.

33. The power generator of claim 22 wherein the lining comprises an anti-corrosive material.

34. The power generator of claim 33 wherein the lining comprises beryllium.

35. The power generator of claim 33 including means for resonating at a high frequency to create arcing of electricity.

36. The power generator of claim 35 wherein the signal is pulsed on and off.

37. The power generator of claim 36 wherein the signal is pulsed on and off at a rate of at least five times per second.

38. The power generator of claim 22 wherein the frequency of the signal is about 2.4 GHz.

39. The power generator of claim 21 wherein the frequency of the signal is about 2.4 GHz.

40. The power generator of claim 21 wherein the signal is pulsed on and off.

41. The power generator of claim 40 wherein the frequency of the signal is about 2.4 GHz.

42. The power generator of claim 41 wherein the signal is pulsed on and off at a rate of at least five times per second.

43. The power generator of claim 21 wherein the lining comprises an anti-corrosive material.

44. The power generator of claim 43 wherein the lining comprises beryllium.

45. The power generator of claim 44 including means for resonating at a high frequency to create arcing of electricity.

46. The power generator of claim 44 wherein the signal is pulsed on and off.

47. The power generator of claim 21 wherein the gas comprises tritium.

48. The power generator of claim 21 including a valve stem secured to the core and being in fluid communication with the interior chamber to facilitate adding and removing the gas from the interior chamber.

49. The power generator of claim 21 wherein the gas comprises deuterium.

50. The power generator of claim 49 wherein the gas comprises tritium.

51. The power generator of claim 22 wherein the core includes a hermetically-sealed access window positioned between the interior chamber and the frequency generator, whereby the access window allows the signal to pass from the frequency generator into the interior chamber, yet maintains the gas at a pressurized state within the core.

52. The power generator of claim 21 including means for resonating at a high frequency to create arcing of electricity.

53. The power generator of claim 52 wherein the gas comprises deuterium.

54. The power generator of claim 53 wherein the gas comprises tritium.

55. The power generator of claim 54 wherein the gas comprises tritium.

56. The power generator of claim 52 wherein the core includes a hermetically-sealed access window positioned between the interior chamber and the frequency generator, whereby the access window allows the signal to pass from the frequency generator into the interior chamber, yet maintains the gas at a pressurized state within the core.

57. The power generator of claim 52 wherein the signal is pulsed on and off.

58. The power generator of claim 57 wherein the core includes a hermetically-sealed access window positioned between the interior chamber and the frequency generator, whereby the access window allows the signal to pass from the frequency generator into the interior chamber, yet maintains the gas at a pressurized state within the core.

59. The power generator of claim 57 including a valve stem secured to the core and being in fluid communication with the interior chamber to facilitate adding and removing the gas from the interior chamber.

60. A power generator for generating electricity comprising:

(a) a core being formed from two substantially spherical halves and having a substantially spherical interior chamber, the interior chamber having a top portion, a bottom portion, and a lining disposed upon a surface of the interior chamber, and the core being filled with a volume of a gas and formed from a magnetic material;

(b) a frequency generator secured to the core and configured to input a signal into the interior chamber to resonate the gas at a high frequency;

(c) a pair of electrical conductors, a first electrical conductor from the pair of electrical conductors connected to the top portion, and a second electrical conductor from the pair of electrical conductors connected to the bottom portion, the pair of electrical conductors provided to conduct the flow of electricity away from the core; and (d) a plurality of conductive electron receivers connected to each of the first and second electrical conductors, the plurality of electron receivers being disposed at least partially within the lining;

(e) wherein the magnetic core is filled with a radio frequency to effectuate a standing wave harmonic resonance for magnetic confinement and inertial confinement.

* * * * *